INVENTOR.
GERALD L. WOODLING
BY
*Oldham & Oldham*
ATTORNEYS.

Jan. 26, 1971 G. L. WOODLING 3,557,510
MOMENT CARRYING AND WATER SHEDDING JOINT CONSTRUCTION
Filed Nov. 29, 1968 2 Sheets-Sheet 2

INVENTOR.
GERALD L. WOODLING
BY
Oldham & Oldham
ATTORNEYS.

United States Patent Office 3,557,510
Patented Jan. 26, 1971

1

3,557,510
MOMENT CARRYING AND WATER SHEDDING
JOINT CONSTRUCTION
Gerald L. Woodling, 1051 Meadow Park Drive,
Akron, Ohio 44313
Filed Nov. 29, 1968, Ser. No. 779,906
Int. Cl. E04c 2/32; E04d 1/06; F16b 5/02
U.S. Cl. 52—534                                  9 Claims

ABSTRACT OF THE DISCLOSURE

The invention relates to a moment carrying and water shedding joint of two pieces of corrugated sheet, where the ends of the corrugations of both pieces terminate along the joint. The joining construction is applicable to right angle joints as well as all other angles except where the two pieces are parallel. Essentially, the joint comprises complementary folds of the sheet metal without any cuts or other alteration being made to the edge configuration of either sheet to facilitate bending. A complete and continuous fold of one sheet over the other is provided to achieve the water shedding joint. Joining between the two sheets by bolts, rivets or the like is accomplished on two spaced parallel planes so that a moment carrying joint is achieved.

---

Heretofore it has been well known that corrugated sheet has been utilized for many construction purposes, such as buildings, cargo containers, and the like. However, one of the constant problems present in this type of construction has always been the problem of joining the ends of the corrugated sheets as a firm joint, where the joint can be easily and quickly made, and with minimum expense. The present invention relates to an extremely simple, yet highly efficient, and inexpensive joint between two pieces of corrugated sheet metal, where the corrugations extend to the joint, and in effect around the joint, so that the strength and inherent rigidity of the corrugations will be retained.

Therefore, it is the general object of the invention to provide an improved joint construction for two pieces of corrugated sheet metal whereby no cuts are necessary to provide a moment carrying and water shedding joint between the two pieces where the ends of the corrugations of both pieces terminate along the joint.

The aforesaid objects of the invention and other objects which will become apparent as the description proceeds are achieved by providing a moment carrying and water shedding joint at an angle of two pieces of corrugated sheet metal where the ends of the corrugations of both sheets terminate along the joint and the resulting junction of the corrugations so formed is characterized by the end of each corrugation being believed at an angle less than 90° from peak to valley across the corrugation equal to substantially ½ the total angle subtended by the sheets in combination, and where the edge of at least one of the sheets is folded along the angle across the corrugations to an angle equal to the angle subtended by the sheets to lie adjacent the edge of the other sheet, and means to hold the folded edge of said one sheet to the adjacent edge of the other sheet.

For a better understanding of the invention, reference should be had to the accompanying drawing wherein.

2

Figure 4:
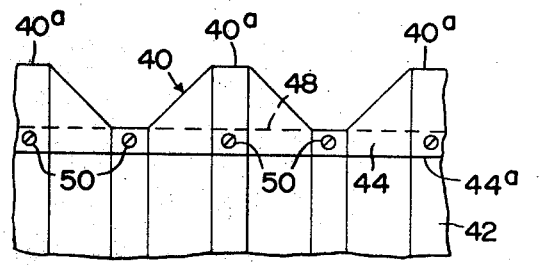
Figure 5:
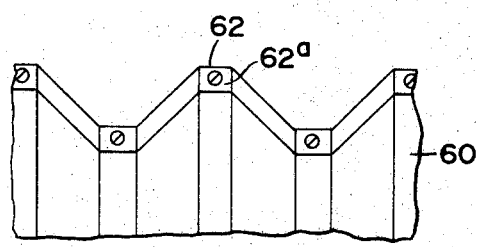
Figure 6:
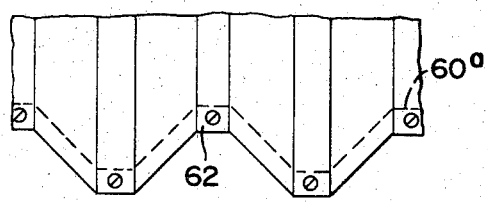

FIG. 4 is a reduced sized front elevation of a modified embodiment of the invention where the same principles are applied;

FIG. 5 is a broken away front elevation of another modification of the invention;

FIG. 6 is a top plan view of the modification of FIG. 5; and

Figure 1:
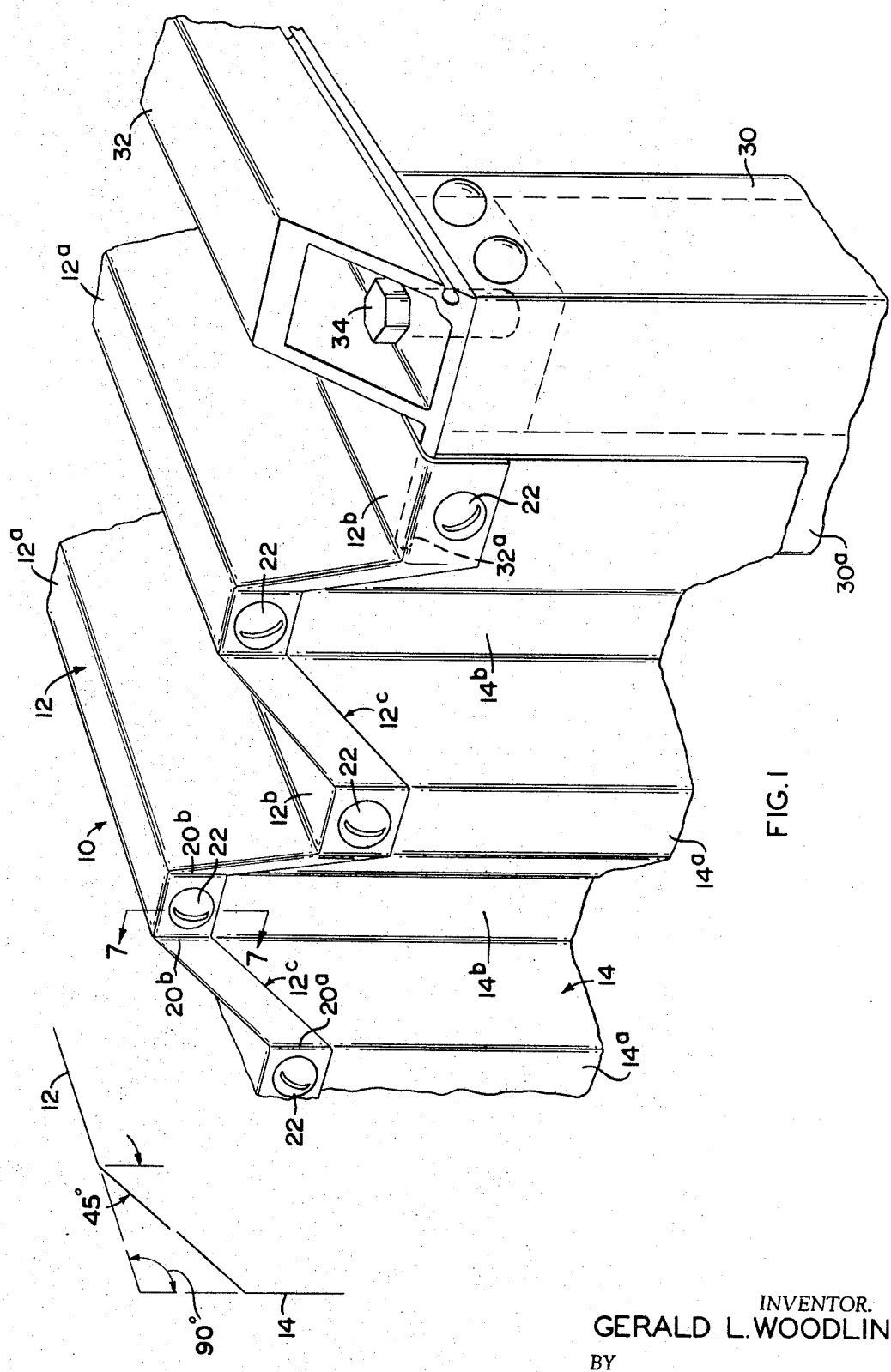
FIG. 1 is a greatly enlarged perspective view of a joint comprising a preferred embodiment of the invention.
Figure 7:
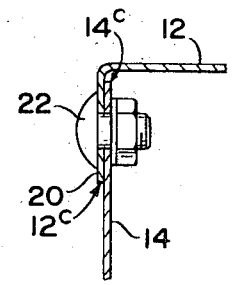

FIG. 7 is an enlarged broken away cross sectional view of the joint between the sheets taken on line 7—7 of FIG. 1.

With reference to the embodiment of the invention illustrated in FIG. 1 of the drawings, the numeral 10 indicates generally a joint construction which is made up of pieces 12 and 14 of corrugated metal sheet material. The piece 12 has peaks 12a and valleys 12b, all in the conventional manner, where each of the peaks and valleys extend to the edge of the piece. Similarly, piece 14 has peaks 14a and valleys 14b, each of which extends to the edge of the material. Naturally, as a requisite for the invention, the spacing and angle of the corrugations in each of the sheets 12 and 14 must be the same, or else joining is not possible.

The joining is accomplished by beveling the edge of at least one piece at an angle which is substantially half of the total angle subtended by the two pieces in joined configuration. For example, in FIG. 1, the total angle subtended is 90°, as indicated by the degree representation on the left side of the figure. In order to subtend this angle of 90°, the corrugated sheet 12 is beveled across the corrugation to approximately 45° from peak 12a toward valley 12b, with sheet 14 also beveled across its corrugations to approximately a 45° angle from peak 14a to valley 14b, both as indicated on the angular configuration to the left of FIG. 1. In order to have a joint where fasteners, such as screws, bolts or rivets do not protrude beyond the inside edge of the corrugated sheets, the edge of each sheet is beveled or notched toward each peak from each valley to a substantially U-shaped notch indicated by numerals 12c and 14c. Naturally, these 45° beveled relationships allow a perfect mating between the edges of the sheets 12 and 14, and in effect, form a 45° beveled joint configuration.

One of the critical problems in forming a lapped joint, as is indicated in FIG. 1 of the drawings between these corrugated edges of sheets 12 and 14, is bending a lap over so that no excessive strains are put on any part of the bent over edge which causes undue buckling or rupture of the metal. It has been found by the invention that only when the total angle subtended by the two sheets is divided approximately in half, and each individual edge beveled so as to equal a complementary half of such angle, and with such beveling being from the peak of one sheet towards the valley of the other sheet, rather than from peak towards peak and valley towards valley, can such folded edge be formed without causing undue metal stresses, rupture, or the like.

The lapped configuration is then achieved by bending a flap or flange 20 on the edge of the sheet 12 which flange 20 subtends the total angular configuration between both sheets 12 and 14, which in the embodiment of FIG. 1, is 90°. With the actual formation of the edge of the sheet 12 in a 45° angular relationship, the flap 20 can be readily formed by conventional metal bending techniques to such 90° relationship without placing any undue metal stresses at any location, and without making any cuts, splices, or the like which are conventionally utilized in metal bending. For example, at bend 20a in the valley 12b of sheet 12, the metal is actually turned inside out on itself as it progresses backwardly and upwardly towards peak 12a where the bend 20b actually turns inside out on itself. In other words, the inside out turning of the metal at bend 20a is compensated for by the inside out turning of the metal along the bend 20b so that no undue stresses are placed at either bend, and in effect a smooth configuration and curvature is obtained. The metal bending of the flange 20 is accomplished quite easily without undue stress because of the inside out bending at the beveled angular relationship existing between the face formed by bends 20a along the flap 20 in relation to the bends 20b forming at the peak 12.

Attachment between sheets 12 and 14 is then achieved by connecting the flat areas of flap 20 associated with each respective peak or valley portion of sheet 14 by appropriate metal screws 22, bolts, rivets, welding, or the like. FIG. 7 clearly illustrates the attachment of flap 20 to the edge of the sheet 14 by screws 22. It should thus be quite clearly understood that attachment is achieved alternately between a valley 12b to a respective peak 14a, and peaks 12a to valleys 14b through the flat faces of flap 20. This means that all attachments between peaks 14a and valleys 12b fall on one plane while attachments of valleys 14b to peaks 12a fall on another plane in parallel spaced relationship thereto. Normally, this spacing will depend upon the actual configuration of the corrugated sheets, and the size or depth of the corrugations between peaks and valleys. In the usual instance, for example, when a cargo container is made of such corrugated sheet members, approximately a one or two inch spacing may be present between such parallel planes. However, the spacing provides an extremely rigid joint structure to any moments which are exerted against it by weights, etc., positioned to the interior and acting on the sidewalls in a cargo container configuration.

An additional feature of the joint FIG. 1 is that where fasteners, such as screws, bolts or rivets are used, they do not protrude beyond the inner face of the corrugated sheets.

FIG. 1 also illustrates the simple attachments of sheets 12 and 14 to a sidewall support post 30, and a top support beam 32. Normally, the post 30 and beam 32 will be of extruded or rolled shapes, and both are simply provided with flanges 20a and 32a, respectively, to which the respective sheets 12 and 14 are appropriately bolted, riveted, screwed, or otherwise attached, as clearly shown in the drawing. The beam 32 may be attached to the post 30 by any appropriate self tapping screw 34, or the like.

Figure 2:
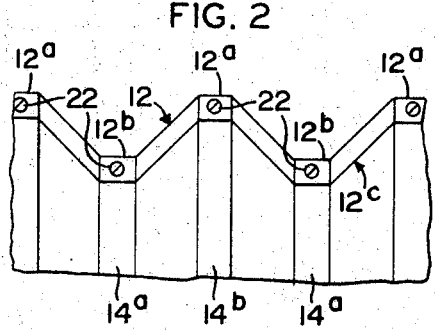
FIG. 2 is a reduced size front elevation partially broken away of the joint of FIG. 1.
Figure 3:
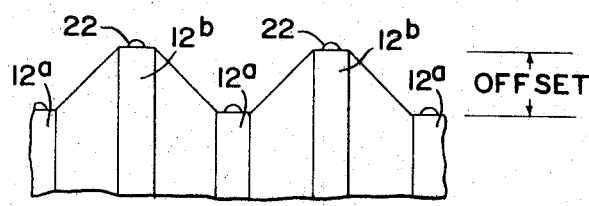
FIG. 3 is a reduced sized plan view partially broken away of the joint of FIG. 1.
Figure 3:
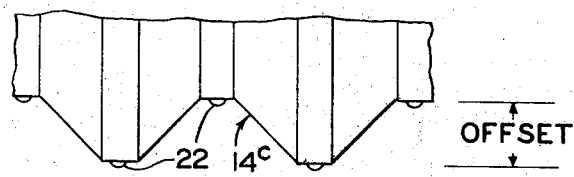

FIGS. 2 and 3 represent the front elevation, and top plan views, respectively, of the same joint described in detail in FIG. 1. Note particularly, the peak and valley attachment relationship, and the parallel offset relationship, as shown in FIG. 3, which provides the great moment carrying rigidity in the angular joint between the two sheets.

FIG. 4 illustrates a slightly modified embodiment of the invention, as shown in front elevation, where a top sheet 40 is attached to a side or bottom sheet 42, but where a flap 44 is formed from the edge of sheet 40 from a straight configuration, rather than a notched configuration of FIG. 1 so that a straight line 44a is evident at the folded edge with respect to sheet 42. This embodiment has the advantage that the edge of sheet 40 does not have to have U-shaped notches as in the embodiment of FIG. 1 where the flap 20 is of equal width along the edge, but it does present slightly greater folding and bending problems because of the greater width on the flap at the peaks 40a of sheet 40. However, the bending can still be accomplished without excessive strain on the metal because again the beveled angular relationship is provided between peak and valley of the respective sheets for a 90° corner joint, as defined in FIG. 1 above. Another advantage in this construction is that sheet 42 can also have a straight edge and not have any bends at all as indicated by dotted line 48, with the attaching screws 50 all falling in line, even though they are offset to again obtain the moment carrying capabilities.

FIGS. 5 and 6 illustrate another modified embodiment of the invention wherein sheets 60 and 62 are also attached according to the same type seam joint relationship except that each of the sheets has a respective flap 60a and 62a so as to achieve a double seamed relationship along the joint. Again, however, the same complimentary angle relationship between peak and valley, and the attachment of the peak of sheet 62 to the respective valley of sheet 60 is followed as defined above. This type of construction provides a more rigid seam because of the double overlap between flaps 60a and 62a, but the same moment carrying capabilities, and metal forming of the flaps is possible because of the complimentary angled relationship.

Thus, it should be seen that the objects of the invention have been achieved by providing a moment carrying and water shedding joint of two pieces of corrugated sheet metal, where the edges of the corrugation of both pieces terminate along the joint. The joining principle is applicable to right angle joints as well as all other angles except where the flap of one sheet cannot be formed parallel to the peak and valley corrugations of the other sheets. The moment carrying capabilities are achieved by the offset relationship between the attachment of peak and valley between the sheets. The water shedding joint is achieved by having the top sheet overlap the side or bottom sheet. Because of the complimentary angled relationship between the formed edges of the sheets, the metal forming of the flaps can take place without any upsetting or disruption of the metal.

While in accordance with the patent statutes only the best known embodiments of the invention have been illustrated and described in detail, it is to be particularly understood that the invention is not limited thereto or thereby, but that other alternatives and embodiments should be within the scope of the invention.

What is claimed is:

1. A sheet metal joint which comprises
   a pair of sheets of metal each having similar corrugations extending to the edges thereof, said sheets being positioned at an angle to each other with the respective peaks of the corrugations of one sheet aligned with the respective valleys of the corrugations of the other sheet, the edge of at least one sheet being beveled across the corrugations to an angle to substantially half the total angle subtended between the sheets, and the edge of at least said one sheet having a continuous flange extending along the full angle subtended between the sheets and laying flat against the continuous corrugated surface of the other sheet adjacent the edge thereof, and
   means securing the flange of said one sheet to the adjacent edge of the other sheet at the peaks and valleys of the corrugation.

2. A joint according to claim 1 where the base of each corrugation in said one sheet mates with the corresponding peak of each corrugation in the other sheet, and where the beveled edge of said one sheet has the base of the bevel at the peaks of the corrugations and the bevel terminating at the base of said corrugations, and where the means securing connect respective peaks and bases together but lie in at least two different planes.

3. A joint according to claim 2 where the beveled edge of said one sheet has U-shaped notches from the base of each corrugation toward the peak so that the folded flange is of substantially equal width along the edge.

4. A joint according to claim 3 where the edge of the other sheet is formed with the same beveled relation and flange as said one sheet whereby the flanges overlap and the means secure the flanges together.

5. A joint according to claim 1 where the angle subtended between the sheets is 90° and the beveled edge of said one sheet is 45°.

6. A moment carrying and water shedding joint between two pieces of corrugated sheet metal characterized by the end of one of said pieces being beveled along a plane inclined from the planes of the valleys and peaks of said piece of corrugated metal by an angle equal to one-half of the angle subtended by the two sheets; and the end portion of the other of said sheets having a continuous flange extending along a line defined by the intersection of the second corrugated piece and a plane inclined from the planes of the planes of the valleys and peaks of said second piece to an angle equal to one-half of the angle subtended by the two sheets, the projection of said flange onto a plane normal to the sides thereof being identical to the cross-sectional configuration of said corrugated sheets; so that the respective peaks of the corrugations of one sheet are aligned with the respective valleys of the corrugations of the other sheet; and includes means to hold said flange to the adjacent edge of said first piece at the peaks and valleys of the corrugations.

7. The joint according to claim 6 wherein the end of said second piece is cut along a plane parallel to the plane defining the fold line of said second piece.

8. A joint according to claim 6 where the means to hold the folded edges of said one sheet to the adjacent edge of the other sheet joins the peak of one sheet to the valley of the other sheet and so on along the entire edge so that substantially half such means are in a spaced parallel plane from the other half of said means.

9. A joint according to claim 7 wherein the edge of both sheets are folded and such folded edges overlap and are joined by said means to hold the folded edges together.

References Cited

UNITED STATES PATENTS

| | | | |
|---|---|---|---|
| 669,148 | 3/1901 | Smith | 52—94X |
| 1,677,031 | 7/1928 | Kuehn | 52—277 |
| 1,855,357 | 4/1932 | Kuehn | 52—277X |
| 2,641,340 | 6/1953 | Howe | 52—94X |
| 2,915,150 | 12/1959 | Weidler | 52—277X |
| 3,323,261 | 6/1967 | Richardson | 52—94X |
| 3,407,546 | 10/1968 | Yates et al. | 52—18 |

FOREIGN PATENTS

| | | | |
|---|---|---|---|
| 854,482 | 11/1960 | Great Britain | 52—18 |
| 1,247,006 | 10/1960 | France | 52—79 |

FRANK L. ABBOTT, Primary Examiner

S. D. BURKE, Assistant Examiner

U.S. Cl. X.R.

52—625; 287—189.36